2 Sheets—Sheet 1.
C. A. HOTCHKISS.
CURRY-COMB.
No. 175,096. Patented March 21, 1876.
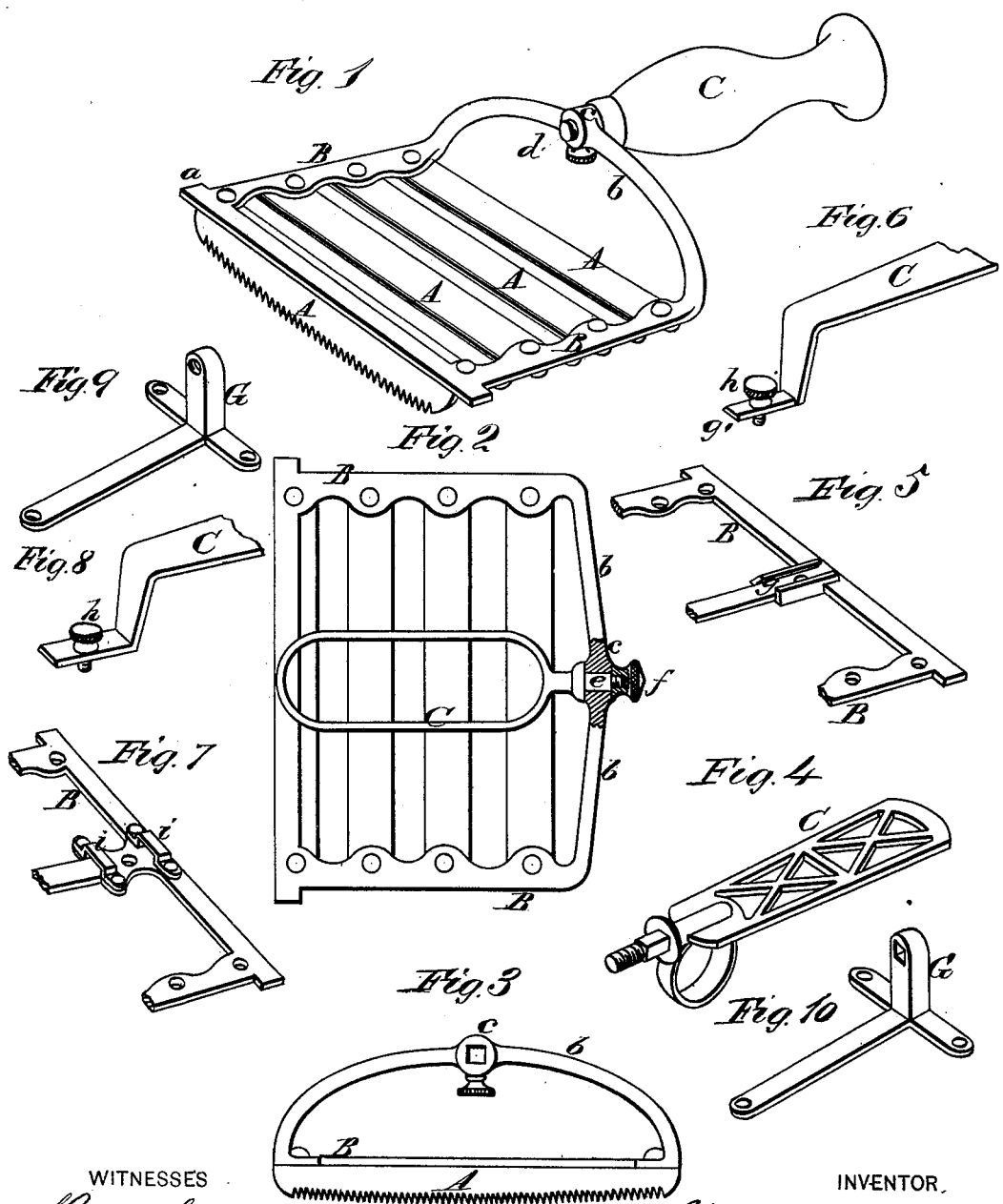
WITNESSES
Robert Everett
George E. Upham
INVENTOR
Charles A. Hotchkiss
Gilmore, Smith & Co.
ATTORNEYS.

C. A. HOTCHKISS.
CURRY-COMB.

No. 175,096. Patented March 21, 1876.

2 Sheets—Sheet 2

WITNESSES
Robert Everitt
George E. Uphaul

INVENTOR
Charles A. Hotchkiss.
Gilmore, Smith & Co.
ATTORNEYS

UNITED STATES PATENT OFFICE.

CHARLES A. HOTCHKISS, OF BRIDGEPORT, CONNECTICUT.

IMPROVEMENT IN CURRY-COMBS.

Specification forming part of Letters Patent No. 175,096, dated March 21, 1876; application filed March 15, 1876.

*To all whom it may concern:*

Be it known that I, CHARLES A. HOTCHKISS, of Bridgeport, in the county of Fairfield and State of Connecticut, have invented a new and valuable Improvement in Curry-Combs; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective of my curry-comb, and Fig. 2 is a plan view, part sectional, of a modification. Fig. 3 is an elevation of Fig. 2, and Fig. 4 is a perspective view of a handle adapted for the comb represented by Figs. 2 and 3. Fig. 5 shows another modification of my invention, and Fig. 6 is a handle adapted for Fig. 5. Fig. 7 is another modification of my invention, and Fig. 8 is a handle adapted for Fig. 7. Fig. 9 shows a screw-tapped post adapted to receive the handle *c* of Fig. 1. Fig. 10 shows a post which is mortised to receive the handle of Fig. 4. Figs. 11, 12, 13, and 14 show other modifications of my invention.

This invention has relation to curry-combs, the handles of which can be adjusted on one side, or over the back of the combs.

The nature of my invention consists in a curry-comb, the handle of which is so applied that it can be readily detached and adjusted over the back of the comb, on one side thereof, or in line with the comb-bars, as will be hereinafter explained.

Figure 11:
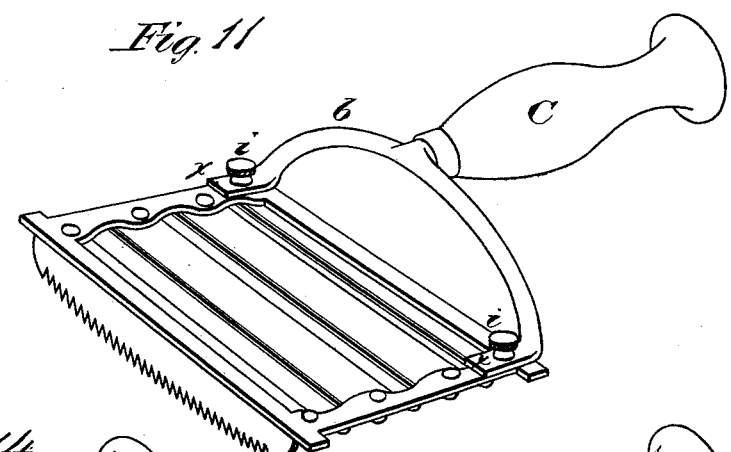
Figure 14:
Figure 12:
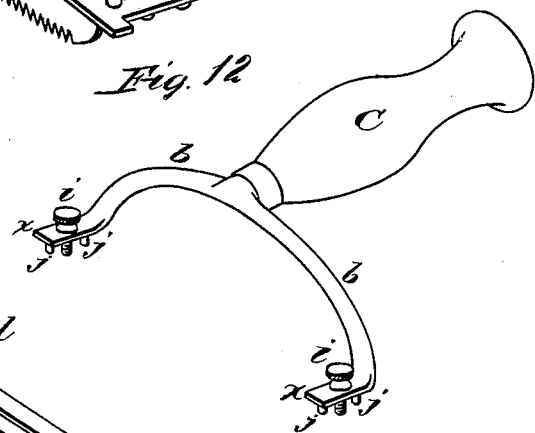
Figure 13:
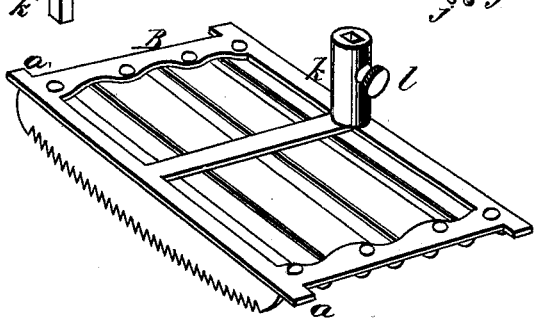

In the annexed drawings I have represented my invention applied to "open-back" combs, but I contemplate applying the invention to "close-back" combs. A A designate the comb-bars, which are secured to a frame, B, constructed with knockers *a a* on its corners, and also with a raised arch, *b*, as shown in Figs. 1, 2, and 3. At or near the highest part of this arch, to wit, at or near the middle of the length thereof, is a screw-tap, to receive a male screw, *d*, which is secured to a handle, C, preferably made of wood, but it may be made of metal. It is obvious that the handle C may be secured into either end of the enlargement *c*, so that this handle can be used on one side of the comb or over the back thereof. It is, of course, necessary to detach the handle from the comb in order to adjust it, which can be readily done. In Figs. 2 and 3 I have represented a comb which has a prismatic hole through the arch *b*, adapted to receive a prismatic tenon, *e*, on a handle, C, which may be made of metal or wood, with a finger-ring formed on it. The tenon *e* prevents the handle from turning in its socket, and a nut, *f*, holds the handle in its place. By unscrewing the nut *f* the handle can be detached from the comb and adjusted on one side of the comb or over the back of the same. Fig. 5 shows part of a comb-frame, which is constructed with a dovetail-groove, *g*, adapted to receive a dovetail-shoe, *g'*, formed on a handle, C, shown in Fig. 6. This handle can be adjusted over the back of the comb or on one side of it, and it can be rigidly secured in either position by means of a thumb-screw, *h*. Fig. 7 shows part of a comb-frame which is provided with staples *i i*, adapted to receive the shoe of a handle represented by Fig. 8. This handle can be reversed like the handles described above, and when it is adjusted as desired it can be rigidly secured by a thumb-screw, *h*. Figs. 9 and 10 show standards G, which are designed to take the place of the arches *b*, shown in Figs. 1 and 2. The standard represented by Fig. 9 is screw-tapped, to receive the male-screw *d* of the handle shown in Fig. 1, and the standard represented by Fig. 10 has a hole through it for receiving the tenon on the handle of Figs. 2 and 4. Fig. 11 shows the arch *b* of the curry-comb permanently secured by a tang formed on it to the handle C, which arch is constructed with flattened extensions *x x* on its extremities, that are secured to the frame of the comb by means of thumb-screws *i i* and studs *j j*. This handle with its arch can be adjusted on one side of the comb, as shown in Fig. 11, or over the comb, in which latter position a grasping-handle is obtained. Fig. 12 shows the arch and handle detached from the comb. Fig. 13 shows a comb-frame, from one side of which rises a post, *k*, having a square socket in it adapted to receive a tenon, *k'*, formed on the tang of a handle, C, and *l* designates a set-screw for receiving the tenon *k'* of the handle C rigidly in its place, whether it be arranged directly over the comb as a grasping handle, or adjusted on one side thereof as a side-handle. If desired, the handles of Figs. 1 and 3 may be rigidly fixed to the comb by means of a screw, which is at right angles to the handles, an illustration of which is given in said figures.

Other suitable means may be adopted for securing the handles rigidly in their places.

What I claim as new, and desire to secure by Letters Patent, is—

A curry-comb having a detachable handle, which is reversible, substantially as described.

In testimony that I claim the above I have hereunto subscribed my name in the presence of two witnesses.

CHARLES A. HOTCHKISS.

Witnesses:
JOHN F. ACKER, Jr.,
ROBERT EVERETT.